Feb. 25, 1969  W. R. BURGESS  3,429,807
METHOD OF REGENERATING ION EXCHANGE MATERIAL
FROM SERVICE DEMINERALIZERS
Filed Dec. 8, 1966

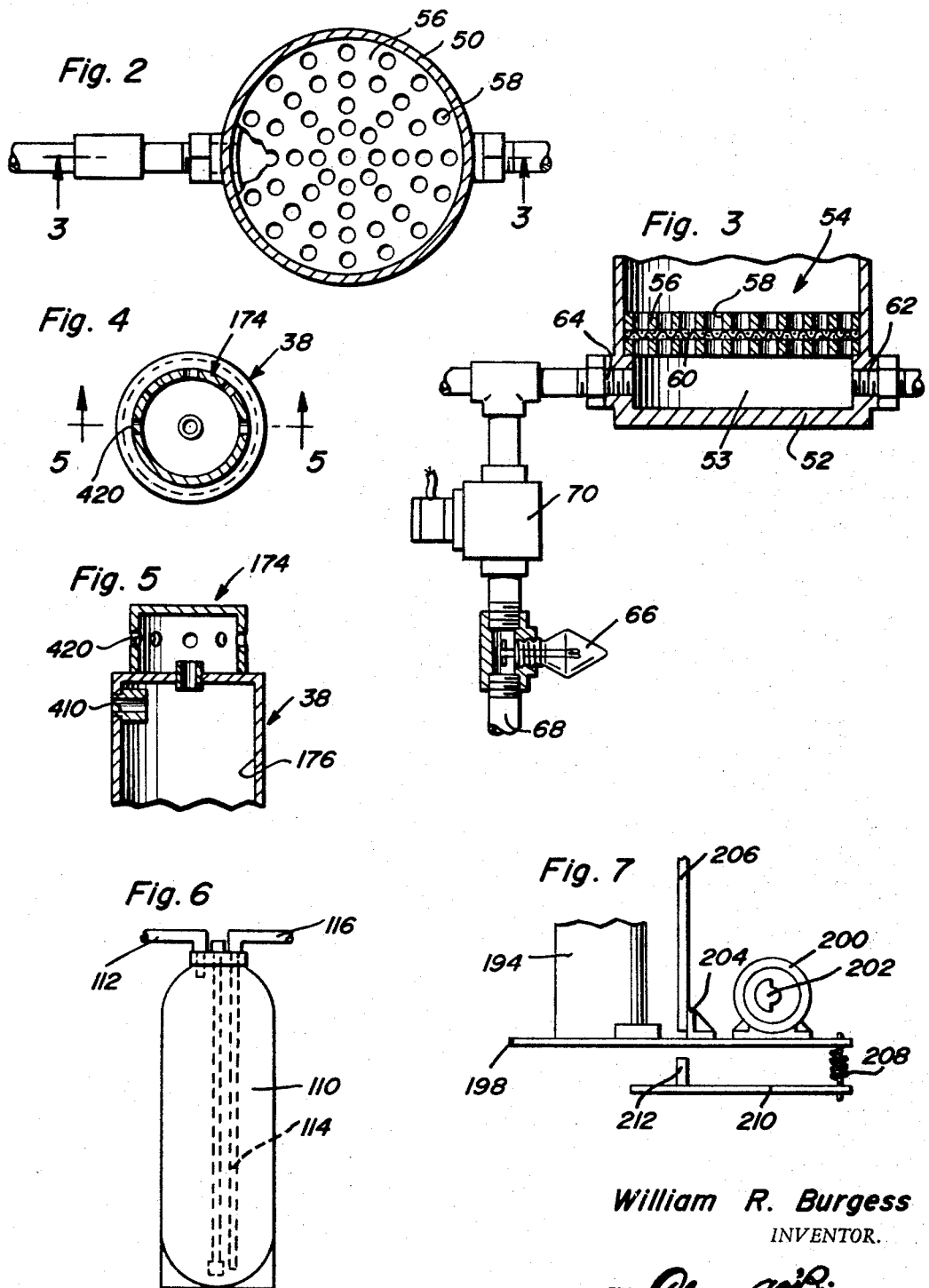

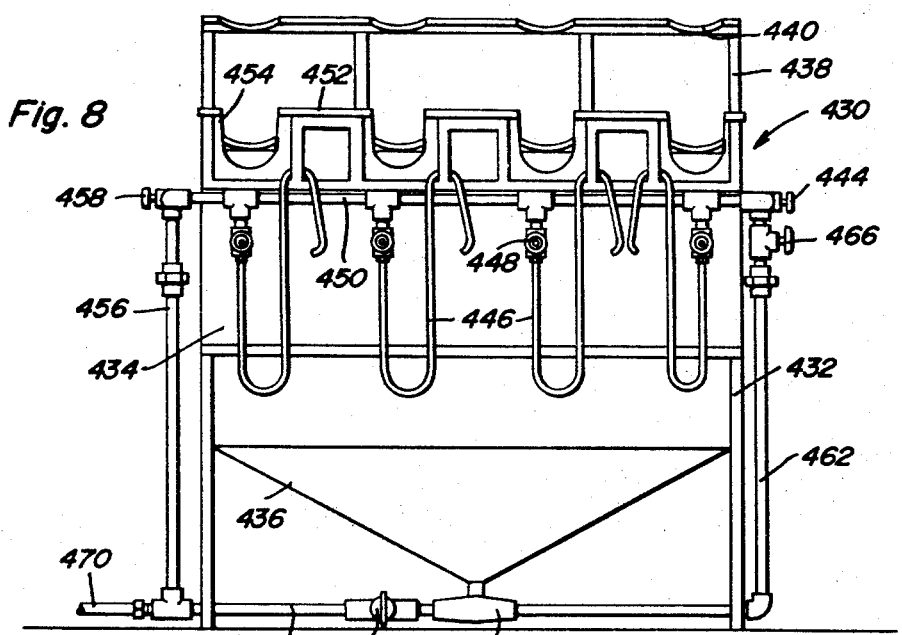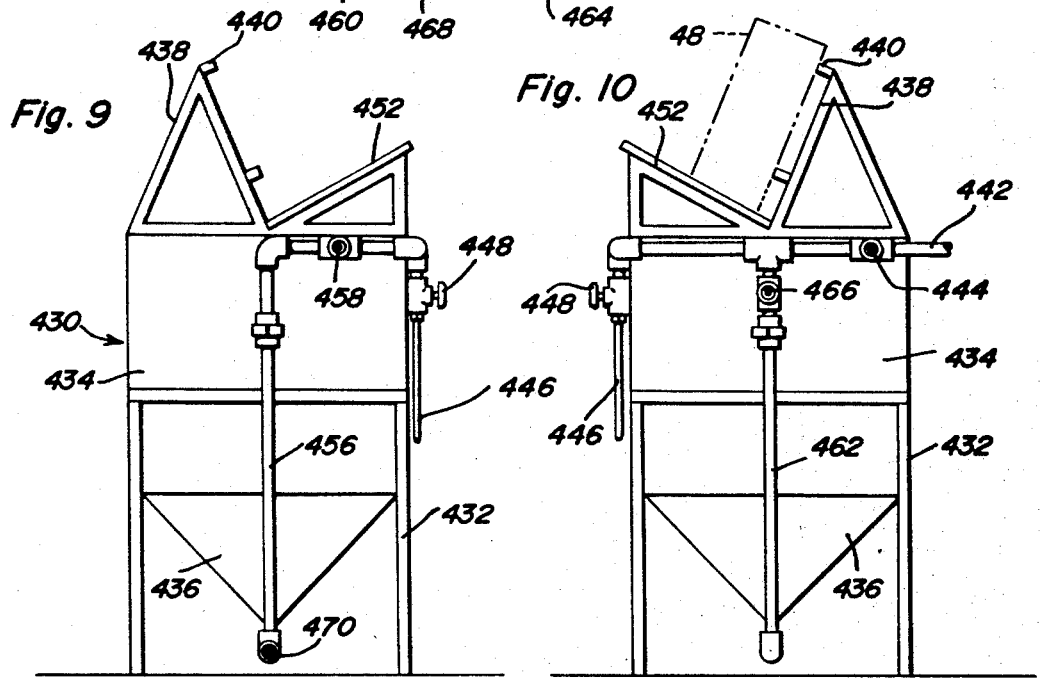

William R. Burgess
INVENTOR.

United States Patent Office 3,429,807
Patented Feb. 25, 1969

3,429,807
METHOD OF REGENERATING ION EXCHANGE MATERIAL FROM SERVICE DEMINERALIZERS
William R. Burgess, P.O. Box 26428, 1013 Wall St., El Paso, Tex. 79926
Continuation-in-part of application Ser. No. 493,188, Oct. 5, 1965. This application Dec. 8, 1966, Ser. No. 609,975
U.S. Cl. 210—25    13 Claims
Int. Cl. B01d 15/06

ABSTRACT OF THE DISCLOSURE

The regeneration of ion exchange material from service demineralizer units in which the ion exchange materials are separated, independently regenerated and subsequently remixed and returned to the service demineralizer unit and employing procedures and techniques in all stages of the regeneration process for assuring complete regeneration, compaction of the ion exchange materials, the use of demineralizer water in conveying, mixing and filling of regenerated ion exchange material for retaining the efficiency at the highest possible level.

---

This application is a continuation-in-part of copending application Ser. No. 493,188, filed Oct. 5, 1965 for Apparatus and Method for Preparing Mineral-Free Water and Ser. No. 791,138, filed Feb. 4, 1959 for Apparatus and Method for Preparing Mineral-Free Water which application is a continuation-in-part of application Ser. No. 697,649, filed Nov. 20, 1957 for Apparatus for Preparing Mineral-Free Water, all now abandoned.

The present invention generally relates to the regeneration of ion exchange materials which are used for the removal of soluble ions from liquid by means of ion exchange and more specifically relates to the regeneration of ion exchange materials used to remove soluble ions from liquid, especially water which employ a mixed bed or a separate bed of ion exchange materials.

The present invention has for one of its objects the provision of a method of regenerating ion exchange material from service demineralizers which may or may not be portable and which employ the principle of either mixed bed or separate bed demineralization wherein the liquid is rendered mineral free, selectively or entirely, by passing it through a bed or filter of completely mixed ion exchange materials (mixed bed) or through separate beds of individual ion exchange materials (separate beds) and particularly has for an object the regeneration of ion exchange materials from more than one demineralizer unit in a simultaneous operation.

The use of such ion exchange materials and the regeneration thereof are well known in the production of purified water. For example, the prior patent to Klumb et al., No. 2,736,698 relates to the technique of mixed bed demineralization and regeneration procedures. Also, in the above mentioned copending applications, the technique and an apparatus for accomplishing the technique is set forth.

As is well-known in the industry, the essential steps in the demineralization and regeneration cycle are as follows:

(1) Exhaustion or actual service;
(2) Removal from service when the unit is no longer capable of purifying water to the desired degree;
(3) Backwashing to cleanse the bed of foreign matter, and to divide the two types of ion exchangers by hydraulic classification. This latter is possible because of the difference in density between the anion and cation exchangers, the anion exchanger being usually lighter;
(4) Re-settling of the bed by shutting off the supply of backwash water. In the highly fluidized state of the expanded bed the heavier cation exchanger settles more rapidly, forming a clear line of demarcation or division between the two layers, generally referred to as an interface;
(5)(a) Passage of caustic solution down through both layers, causing the anion exchanger to be regenerated to the hydroxide state, and the cation exchanger remaining in the exhausted state; or (b) passage of a caustic solution through the anion resin layer only, drawing it off at the interface;
(6) Rinsing of excess caustic solution from the bed;
(7) Passage of an acid solution downflow through only the cation exchanger or the lower layer, effecting its conversion to the hydrogen state (if alternate step 5(b) is used, the acid may be added upflow at the same time and drawn off at the interface);
(8) Rinsing of the excess acid solution from the bed;
(9) Mixing of separated beds, if a mixed bed principle is to be employed after which the unit is again ready for service.

Specifically, the present invention is concerned with regeneration of the ion exchange material and relates to steps 2 through 9 set forth previously.

An object of the present invention is to provide a method and apparatus of regeneration of ion exchange material so that such materials from more than one service unit either mixed bed or separated bed may be regenerated simultaneously.

Another object of the present invention is to provide a novel method as set forth above in which the regeneration vessels or tubes are equipped with an electric signal device such as that disclosed in copending application Ser. No. 547,103 filed Mar. 15, 1966, now Patent No. 3,334,745, issued Aug. 8, 1967 for Demineralizer Service Unit With Encapsulated Light Circuit in order to indicate the quality of the rinse cycle.

Still another feature of the invention is to provide a novel method in which the ion exchange materials are received from the service demineralizers in a separation tube with the separation of the ion exchange materials being accomplished hydraulically by water upflow with the demarcation line or interface being retained in the separation tube or vessel for assuring effective separation of the ion exchange materials thereby increasing the efficiency of the system since no mixed ion exchange materials are regenerated in the regenerating vessels or tubes.

Yet another significant object of the present invention is to provide a demineralization system which has the highest possible capacity which is accomplished by the use of demineralized water for regeneration, vibration to compact the bed during regeneration, the use of demineralized water in material transfer and filling, preventing air pockets from forming in the ion exchange materials, and the final use of a vibrator to pack the regenerated ion exchange material in the service units.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a plane sectional view taken along section line 2—2 of FIGURE 1 illustrating the bottom of one of the regenerating tubes and specifically the screen structure therein;

FIGURE 3 is a detail sectional view taken substantially upon a plane passing along section line 3—3 of FIGURE 2 illustrating further structural details of one of the tubes;

FIGURE 4 is a plane sectional view taken substantially upon a plane passing along section line 4—4 of FIGURE 1 illustrating the construction of a premixer disposed upon top of a mixer vessel;

FIGURE 5 is a detailed sectional view taken substantially upon a plane passing along section line 4—4 illustrating further structural details of this part of the apparatus;

FIGURE 6 is a diagrammatic view of the demineralizer service unit;

FIGURE 7 is a diagrammatic elevational view of a typical vibrator for use in refilling the service demineralizer unit;

FIGURE 8 is a front elevational view of an apparatus for simultaneous removal of resin from a plurality of surface units;

FIGURE 9 is an end elevational view of the construction of FIGURE 8;

FIGURE 10 is an end elevational view of the construction of FIGURE 8 illustrating the end thereof opposite from FIGURE 9;

Figure 1:
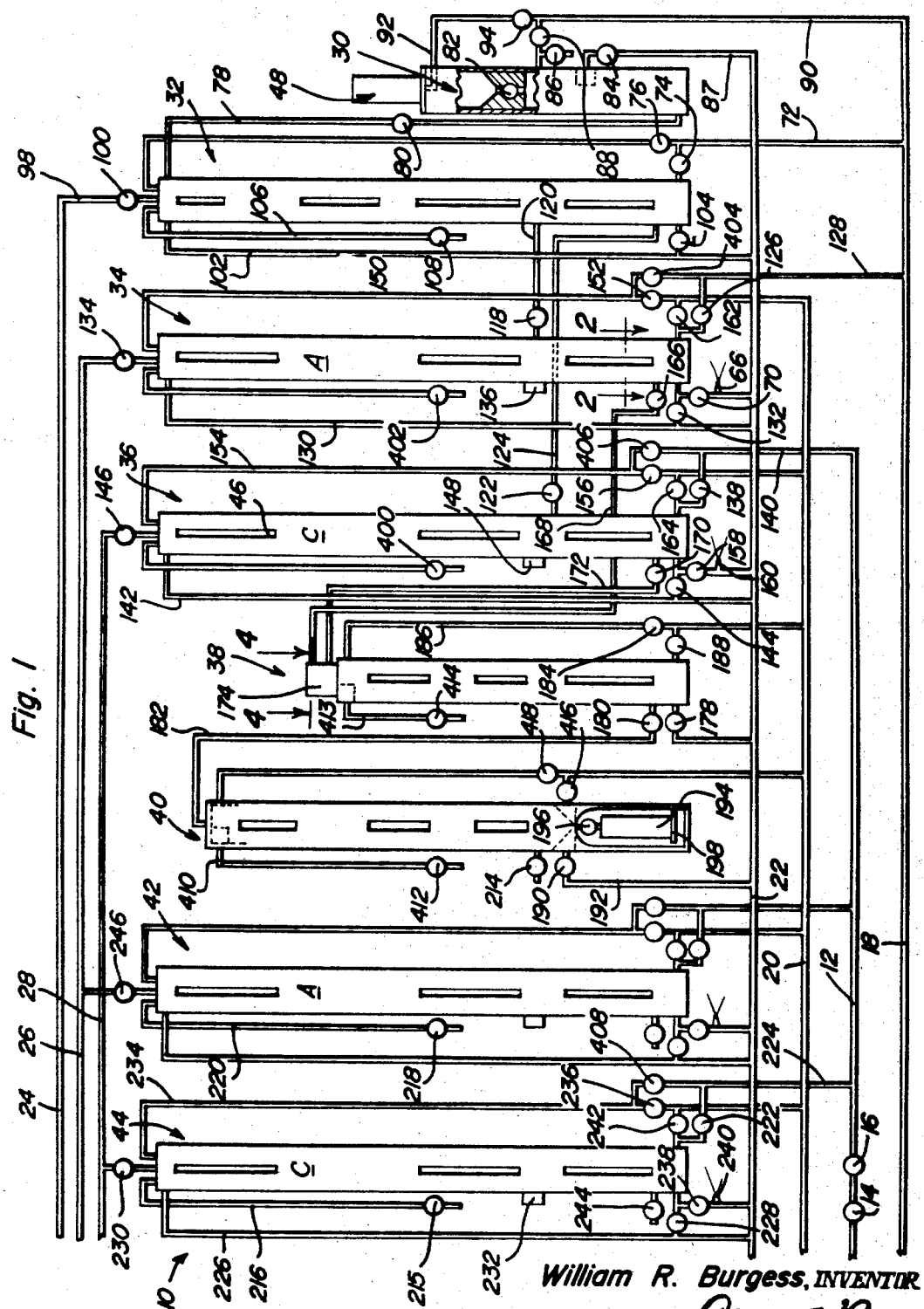
FIGURE 1 is a diagrammatic view of the regeneration plant incorporating the novel method and apparatus of the present invention therein and also illustrating the layout of the regenerating plant inasmuch as it illustrates a parts placement arrangement.

Referring now specifically to the drawings, the regenerating plant or apparatus is generally designated by the numeral 10 in FIGURE 1 and this figure is not only schematic but also illustrates the placement of the components. Various minute details of the pipe connections, valve and the like have not been illustrated inasmuch as these are conventional plumbing components.

The apparatus 10 includes a tap water line 12 which is connected to a suitable source of tap water through a cut-off valve 14 and also a pressure regulating valve 16 to provide a source of tap water at regulated pressure. Also, there is provided a soft water line 18 and a demineralized water line 20 both of which are connected to a suitable source of the particular type of water which they convey. A main drain line 22 is also provided in generally parallel relation to the water lines and as illustrated in FIGURE 1, the aforementioned tap water line 12, soft water line 18, demineralized water line 20 and main drain line 22 are preferably orientated in underlying relation to the remainder of the system.

Orientated above the major components of the system is a saturated brine line 24, a hydroxyl line 26 and an acid line 28 which may be orientated in parallel relation to each other and communicated respectively with a source of material which they convey.

Orientated in generally vertical position and preferably in alignment as illustrated in FIGURE 1 is an emptying tube or transfer unit generally designated by the numeral 30, a separator tube or vessel generally designated by numeral 32, a mixed bed anion regenerating tube or vessel 34, a mixed bed cation regenerating tube generally designated by numeral 36, a mixer vessel generally designated by numeral 38, a filler vessel or tube generally designated by numeral 40, a separate bed anion exchange tube or vessel 42 and a separate bed cation regenerating tube 44 all of which may be in the form of cylindrical tubes or tanks and each of which is provided with transparent windows 46 for purposes of inspection and observation of the materials disposed interiorly thereof. In lieu of the various tubes and tanks being provided with transparent window inserts 46, the entire tube or vessel may be constructed of transparent material. The emptier tube or transfer unit 30 need not have transparent windows therein or need not be transparent since the ion exchangers are merely transferred into this tube from a plurality of service demineralizers one of which is generally designated by numeral 48 in FIGURE 1.

FIGURES 2 and 3 illustrate in detail a portion of the construction of the lower end of the anion regeneration tube 34 which includes a cylindrical wall 50 having a closed bottom 52 and a screen assembly 54 incorporated therein which includes a pair of spaced plates 56 with perforations 58 therein and a reticulated screen member 60 disposed between the plates. As illustrated, the wall 50 is provided with passageways 62 and 64 therein for connection with fluid lines in a manner described in more detail hereinafter with it being pointed out that conventional connecting procedures and structures may be employed such as screw-threaded fittings and the like. A similar screen assembly is provided in the various tubes or vessels. Also, an electric signal device 66 is provided in the drain line 68 which communicates with the main drain line 22 and a drain valve 70 is provided above the indicator assembly 66 for use to indicate the end point of the rinse cycle. The specific structure of the indicating device is dislosed in Patent No. 3,334,745 for Demineralizer Service Unit With Encapsulated Light Circuit.

The cation tube or vessel 36 is similar to the anion tube or vessel 34 in that it is screened and also provided with a signal indicator circuit connected at the bottom drain.

The separator tube or vessel 32 is similar in construction to the cation and anion tubes and performs the important function of separating the ion exchange materials. This is necessary as the ion exchange materials cannot be regenerated when they are mixed. Inasmuch as the ion exchange materials differ in density, hydraulic separation of these materials under controlled conditions is possible. The ion exchange material themselves are commercially available and well-known in the art. The separator tube 32 is screened in the same manner as illustrated in FIGURES 2 and 3 and the chamber 53 between the bottom 52 and the screen assembly 54 serves to receive soft water from the soft water line through the branch line 72 and an inlet valve 74. This water will flow upwardly uniformly and without turbulence through the separator tube 32 and the even turbulent-free flow results in perfect separation and greatly reduced separation time. Also, the branch line 72 extends up to and is communicated with the top of the separator tube 32 with a control valve 76 being provided for selectively admitting soft water into the lower end of the separator tube 32 or into the upper end thereof. Also communicated with the upper end of the separator tube 32 is a resin transfer line 78 having a valve 80 therein and communicated with the lower end of the emptier tube 30 for transferring the ion exchange material from the emptier tube 30 into the separator tube 32.

It is pointed out that the emptier tube or vessel 30 is constructed to hold ion exchange resins from several service dimineralizers. The resin from the demineralizers is funneled into the lower chamber of the emptier tube 30 through a valve 82. The emptier tube 30 also includes a drain valve 84 which permits excess water to be drained from the bottom chamber of the emptier tube 30 to be drained through a branch drain line 86 into the main drain line 22. The valve 80 communicates the bottom chamber of the emptier tube 30 to the separator vessel 32 and this is accomplished by closing valve 82, valve 84 and valve 86 and opening valve 80. The valve 86 provides a vent for the lower chamber of the emptier tube 30 through a screened opening. Of course, valve 88 in the soft water branch line 90 is opened which allows soft water to accomplish the resin transfer. Tap water could also be used for transferring ion exchange resins from the emptier tube 30 to the separator tube 32. Also, a water line 92 extends into the demineralizer service unit 48 and is controlled by a valve 94 to facilitate hydraulic removal or emptying of the dimineralizer unit 48. The line 92 is connected to the demineralizer unit outlet thus causing accelerated removal of the resins to the demineralizer service unit inlet port when it is inverted.

The separator tube 32 includes a branch line 98 communicated with the saturated brine line 24 and the upper end of the separator tube 32 through a control valve 100. Also, an overflow line 102 is communicated with the upper end of the separator tube 32 and communicated with the main drain line 22. The lower end of the separator tube 32 is communicated with the overflow line 102 through a control valve 104. Also, the upper end of the separator tube 32 is provided with a resin inlet line 106 having a valve 108 therein which enables a larger service demineralizer such as designated by numeral 110 and illustrated in FIGURE 6 to be connected directly to the separator tube for discharging the resin material therein through the valve 108 and line 106 without the resin materials being first discharged into the emptier tube 30. This is accomplished by connecting a soft water line or hose as indicated generally at 112 to the demineralizer unit inlet and inserting the resin transfer manifold 114 down to the bottom of the demineralizer service unit 110 and connecting the manifold 114 by means of a flexible hose 116 or the like to the valve 108 on the inlet line 106 so that the resin may be transferred directly into the separator tube 32. Transfer is accomplished by opening the soft water line 112 connected to the demineralizer unit 110 and also opening valve 108 thereby allowing soft water pressure to force resin from the demineralizer unit through the tube or line 106 into the separator 32. Several units may be emptied in this manner until a batch quantity is reached.

After the mixed bed ion exchange resins have been placed in the separator tube either by direct transfer from the large service demineralizers which are designated by numeral 110 through the line 106 or from the emptier tube 30 through the line 78, the valve 100 in the branch line 98 connected to the saturated brine line 24 is opened and a predetermined amount of brine solution is allowed to enter the separator tube 32. The drain valve 104 and the soft water inlet valve 76 are opened. The brine solution passes down through the mixed resin bed through the drain valve 104 and thus into the main line 22. The open soft water valve 76 allows soft water to be introduced to the top of the resin bed so as to rinse excess brine from the resin. The brine solution has entered the separator tube and the valves 104 and 76 are closed after a prescribed time determined by the amount of resin contained in the separator tube 32. The addition of a brine solution is to totally exhaust any resin that might still be partially in hydroxyl or hydrogen form as separation proceeds more quickly when the resins are totally exhausted. The brine solution is also used as an agent to flush out and remove unwanted organic materials from the resin.

Soft water is then introduced to the bottom of the separator tube 32 by opening valve 74 in branch line 72 and the flow of soft water into the bottom of the separator tube 32 is such that the ion exchange material will be retained in the separator in allowing any foreign matter which was filtered out of the demineralized water when the resin was in service to be washed out of the overflow line 102 and into the main drain line 22. When perfect separation has occurred as is evident by visual inspection through a window 46, transfer valve 118 in transfer line 120 is opened to carry the anion material from the separator tube 32 into the anion tube 34. Correspondingly, valve 122 in transfer line 124 is open for transferring the cation material from the separator tube 32 into the cation tube 36.

The soft water inlet valve 74 is closed after transfer of the separated resins and the drain valve 104 is opened to drain the water from the separator tube 32. It is pointed out that water is run upflow in the separator 32 during the entire resin separation procedure. Complete separation is possible inasmuch as it is not necessary to take all of the cation and anion exchange material from the separator tube 32. In fact, a volume of several inches on either side of the interface, the area of dissimilar resin contacts is always left in the separator tube 32. Thus, the resins are never regenerated in mixed condition.

The soft water inlet valve 126 is opened in branch line 128 which is connected with the soft water line 18 to thoroughly backwash the anion resin in the anion regenerating tube 34 with the backwash being discharged through an overflow line 130 communicating with the upper end of the anion tube 34 and communicating with the main drain line 22. This backwashing is conducted for a predetermined time and thereafter, the valve 126 is closed and the drain valve 132 is opened to drain the backwash soft water from the anion tube 34 to a predetermined visual level. Thereafter, a predetermined quantity of hydroxyl base chemical, such as caustic soda is added to the anion tube 34 by opening valve 134 in the hydroxyl supply line 26. The hydroxyl base chemical is preferably a liquid chemical and the hydroxyl base solution flows down through the anion exchange resins in the anion tube 34 and out through the drain valve 132 into the drain line 22. In order to prevent the formation of air pockets and to prevent channelization through the resins, a vibrator 136 is connected with the anion tube 34 in order to vibrate the resin material to compact the anion exchange material thus effecting a more complete regeneration.

Also, the cation exchange material is backwashed in the cation tube 36 by opening a valve 138 in a tap water branch line 140 which is communicated with the tap water line 12 and admits tap water into the cation exchange tube 36 for backwashing the cation exchange material with excess backwash water being drained through an overflow line 142 communicated with the upper end of the cation tube 36 and communicating with the main drain line 22. This backwashing operation will thoroughly remove all silt and colloidal matter from the cation exchange material and after a prescribed time, the valve 138 is closed and the drain valve 144 is opened and the water level in the cation tube 36 is drained to a visual level.

An acid inlet valve 146 is then opened to add a prescribed amount of acid such as hydrochloric acid or other suitable acids to the cation tube 36 from the acid supply 28. The drain valve 144 is opened for the optimum regeneration flow rate setting and the acid solution flows down through the cation exchange bed in the cation tube 36 ultimately to the drain line 22. A vibrator 148 identical to the vibrator 136 is mounted on or connected with the cation tube 36 so that during the chemical flow, the cation exchange material will also be compacted to effect better regeneration.

In each instance, the flow of the regenerating solution is controlled and the purpose of the base and acid solution is to remove the anion and cation, placed on the resin during the service cycle, from the exchange materials and return them to their regenerated hydroxyl and hydrogen state respectively. When the regeneration cycle has been completed and the flow of the regenerant is stopped by closing the valves 134 and 146 respectively, the resins in the anion tube 34 and the cation tube 36 which has been regenerated are then thoroughly rinsed so that they will be free of any regenerants and this rinsing operation is accomplished by using demineralized water from the demineralized water supply line 20.

Demineralized water enters the top of the anion tube 34 through a branch line 150 by opening valve 152 therein and a similar branch line 154 and valve 156 communicates the demineralized line 20 with the top of the cation tube 36. After a predetermined specified regenerant rinse contact time, rinse water drain valve 70 communicated with the bottom of the anion tube is opened as illustrated in FIGURE 3 and the rinse water then drains to the drain line 22 past the rinse end point light indicator 66 which also is illustrated in FIGURE 3 thus indicating the quality of the rinse water thereby sensing the rinse completion inasmuch as the end point light 66 will glow when all chemicals are rinsed from the anion exchange materials in the anion tube 34. When this occurs all lines to and from the anion tube 36 may be closed.

Correspondingly, the regenerant rinse drain valve 158 connected with the cation tube 36 may also be opened after a prescribed regenerant rinse contact time for flow of rinse water past end point indicator 160 and the operation will be the same as described in connection with the anion tube 34.

With the anion exchange material and the cation exchange materials being completely regenerated and then completely rinsed free of the regenerant solutions by the use of demineralized water as indicated by the rinse end point indicator, the ion exchange materials are transferred from the tubes 34 and 36 respectively to the mixer tube 38 where the anion and cation exchange materials are remixed.

This transfer is accomplished by employing demineralized water from the demineralized water line 20 with demineralized water passing upwardly through the anion tube 34 by opening valve 162 and upwardly through the cation tube 36 by opening valve 164 which operatively connect with the demineralized water line 20 and which serves to loosen and fluff the resin beds by the upflow of demineralized water therethrough with the overflow being drained through the overflow lines 130 and 142. When the resin bed has been loosened and fluffed since it was previously compacted during the regeneration cycle, the valves 162 and 164 are partially closed and valve 166 in anion transfer line 168 is open and valve 170 in cation transfer line 172 is opened and the transfer lines 168 and 172 enter at the upper end of the mixer tube 38 with the flow of demineralized water into the anion tube 34 and into the cation tube 36 building up sufficient head in these tubes to force the resin into the mixer tube 38. The ion exchange materials, usually resinous, remain fluid due to the upflow action of the demineralized water, therefore, there is no stoppage of resin in the transfer lines.

The transfer lines 168 and 170 actually enter a premixer 174 at the upper end of the mixer tube 38 with the streams of water and resin being intermixed as they enter the main chamber 176 of the mixer tube 38 from the premixer 174. The correct proportion of the anion and cation exchange materials is regulated by regulating the valves 166 and 170 respectively and visual observation of the contents of the anion tube and the cation tube discharge rates provides perfect proportioning as the anion tube 34 and cation tube 36 are sized so that the ion exchange material level in each is the same although the total quantities may differ. Thus, by bringing the level in each of the tubes 34 and 36 down equally during the transfer operation, perfect proportioning and mixing of the ion exchange materials is obtained. During the transfer operation, the drain valve 178 in the mixer tube 38 is open to allow excess transfer water to flow from the mixer tube 38 to the drain line 22.

Once the anion tube 34 and the cation tube 36 are empty, the flow of demineralized transfer water is stopped by closing valves 162 and 164 and the mixed resin bed is thus completely transferred to the mixer tube and is thus ready to be transferred to the filler tube 40. This transfer is accomplished by opening transfer valve 180 in transfer line 182 which extends from the bottom of the mixer tube 38 to the top of the filler tube 40 and opening demineralized water valve 184 in branch line 186 which communicates the demineralized water line 20 with the top of the mixer tube 38 thus allowing water pressure to be applied to the top of the mixer tube 38 for forcing resin from the mixer tube 38 to the filler tube 40. Also, demineralized water inlet valve 188 may be opened either partially or completely to uplift resin in the mixer tube 38 and make them more fluid thus aiding in the transfer. Drain valve 190 in the filler tube 40 is connected to a branch line 192 communicated with the main drain line 22 for draining excess water from the filler tube 40 and thereafter, valves 184, 188 and 190 are closed and the resin transfer from mixer tube 38 to filler tube 40 is complete.

A service demineralizer unit 194 which may be either the demineralizer unit 48 which was formerly emptied and cleaned, sterilized and chlorinated or any other service unit is placed under filler valve 196 at the bottom of a filler tube 40 which has a similar funneling arrangement to that employed in the emptier tube 30. The line containing the filler valve 196 may have an adapter which inserts and seals on the port on the top of each demineralizer service unit 194. A platform 198 supports the demineralizer service unit 194 and is illustrated in FIGURE 7, the platform 198 is vibrated by a motor 200 driving an eccentric weight 202 attached to the platform 198 in spaced relation to the point of engagement with the service demineralizer unit 194. The platform 198 may be hingedly supported by a hinge support 204 connected to a support bracket 206 or the like. The platform 198 is counterbalanced by a spring 208 at one end of the platform which is anchored to a suitable supporting member 210 having a stop 212 associated therewith to limit oscillation of the platform 198. It is pointed out that any conventional type of vibrator may be used although the illustrated vibrator effectively serves the purpose for vibrating the service unit 194 while it is being filled. The vibrating action is most important in that it enables approximately 20% more ion exchange material to enter the demineralizer service unit 194 than could be normally placed therein thereby increasing the capacity of the demineralizer service unit by a corresponding percentage when it is placed in service. It is pointed out that a similar mechanical vibrating unit such as a motor with an eccentric weight may be attached to the anion tube 34 as indicated at 136 and the cation tube 36 as indicated at numeral 148 and similar agitators or vibrators are attached to the separate bed resin tubes 42 and 44 in a manner described hereinafter.

As the filler valve 196 is open and the resins flow into the demineralizer service unit 194 from the filler tube 40, mixing of the ion exchange material continues as it flows into the service unit. Also a filler valve 214 is provided on the filler tube 40 adjacent the lower end thereof for filling large service demineralizers such as 110 illustrated in FIGURE 6 by using a suitable adapter, hose or the like communicated with the resin filler port on the service demineralizer unit. A similar vibrating mechanism such as that illustrated in FIGURE 7 may be employed for large service demineralizer units 110 and these may be separately orientated as compared with the orientation with the filter tube 40 as illustrated in FIGURE 7.

In separate bed demineralizer service units where each service unit contains only cation or anion exchange material, the ion exchange materials are regenerated in the anion tube 42 and the cation tube 44 inasmuch as separation of the ion exchange material is not necessary.

The separate bed demineralizer units are the same as large mixed bed demineralizer service units such as designated by reference numeral 110 and illustrated in FIGURE 6 and the resin material from the separate bed demineralizer unit 110 is transferred to the respective tubes 42 and 44 in the same manner as set forth in connection with demineralizer unit 110 with the cation exchange material being introduced into the tube 44 through inlet valve 215 and inlet line 216 communicating with the top of the cation tube 44 and the anion exchange material is introduced through inlet valve 218 in the anion inlet line 220 communicated with the upper end of the anion tube 42. Thus, the ion exchange materials which are in separate service units are introduced into the tubes 42 and 44 respectively by a hydraulic transfer operation. Any number of separate bed cation demineralizers are added to cation tube 44 limited only by the comparative size of the demineralizer service units and the cation tube 44 and the same is true of the anion tube 42. When transfer of the exchange material to cation tube 44 is completed, the emptied demineralizer unit is of course disinfected by chlorination or the like. The cation exchange material is washed clean of material filtered out during the service cycle, such as sand, silt or the like during a backwash operation by opening tap water upflow valve 222 in tap water branch line 224 to a point to keep exchange material contained in the cation tube with excess water overflowing through overflow line 226. After a predetermine length of time, the upflow valve 222 is closed and the drain valve 228 is opened and the backwash tap water is drained from cation tube 44 to the predetermined level. Valve 230 communicated with the acid supply line 28 is then opened and a predetermined amount of acid solution is allowed to enter cation regenerating tube 44. After the proper quantity of acid solution has entered the cation tube 44, drain valve 228 is opened for optimum regeneration flow and the acid solution flows down through the exchange bed in cation tube 44 to the main drain line 22. A vibrator 232 is connected to the cation tube 44 and operates in the same manner as the vibrators 136 and 148.

Regeneration flow is stopped when the chemical solution reaches the top of the exchange material and when the regeneration flow is stopped, the cation exchange material is rinsed free of the remaining regenerants with it being understood that the valve 230 is, of course, is closed. This rinsing operation is accomplished by the employment of demineralized water through a demineralized water line 234 communicated with the demineralized supply water line 20 and valve 236 in line 234 will be opened thus introducing the demineralized water into the top of the cation tube 44 for rinsing with deionized water in a downward direction with deionized water being dispersed at the top of the cation tube 44. Drain valve 228 is fully open to expedite rinsing of the cation exchange material and after a certain time lapse depending upon the amount of exchange material in the cation tube 44, the drain valve 238 is also opened to enable flow of the rinse water through an end point quality control light 240 which operates in the manner of the control light 66 to indicate the quality of the rinse end point. When the proper quality of the end point of the rinse has been indicated, a signal is given at which time the drain valves 228 and 238 are closed and the demineralized water valve 236 is also closed.

The cation exchange material is now ready to be transferred from the regeneration tube 44 back to the demineralizer service unit similar to that illustrated in FIGURE 6 and this is accomplished by opening the upflow demineralized water valve 242 to loosen or fluff the previously compacted exchange resin. A resin transfer line such as a flexible hose or the like (not shown) is connected to the resin transfer valve 244 in the cation exchange tube 44 and extends to the inlet of the demineralizer service unit for refilling the demineralizer service unit which may be vibrated by a separate vibrator such as that illustrated in FIGURE 7. When the transfer of exchange material is completed, the valves 242 and 244 are closed and the drain valve 228 is open to drain excess water from the cation regeneration tube 44.

Regeneration of separate bed anion exchange material is performed in anion regeneration tube 42 and operates in substantially the same manner as discussed previously in connection with the cation exchange materials except that an inlet valve 246 is provided for communicating the hydroxyl or caustic supply line 26 with the upper end of the anion regenerating tube 42. Other than this difference, the structure and operation of the anion regenerating tube 42 is the same as the cation exchange tube 44 and the details thereof need not be described for a complete understanding of the operation and structure of the anion tube 42.

When the demineralized water enters the top of each of the regeneration tubes during the rinsing operation, the water entering the respective tubes may be connected to a spray head within the tube to completely spray the water over the area of the top of the regenerated resins for thorough contact and rinsing of the demineralized water with the resins. This completely removes chemicals from the tube side walls after the regeneration step of the chemical contact with the resins.

The valves 400 and 402 serve to connect two exhausted demineralizer units for direct resin transfer from the demineralizer units to the cation vessel 36 and the anion vessel 34 respectively and serve the same purpose as valves 215 in relation to the cation vessel 44 and 218 in relation to the anion vessel 42.

Valves 404, 406 and 408 are auxiliary valves for use in adding the appropriate waters to the regeneration vessels in the event the proper water level is not maintained prior to chemical additions. Normally, the proper water level is reached after backwash by using the drain valve. However, sometimes the drain valve is not turned off at the proper time thus allowing the water level in the vessel to fall below that desired and these valves 404, 406 and 408 enable addition of water to bring the water level to the desired level.

Line 410 communicated with the filler tube 40 is provided with a valve 412 therein and serves as vent overflow for the filler tube 40 and is opened during resin transfer from the mixer tube 38 into the filler tube 40. Valve 414 in the line 413 communicated with the upper end of the mixer tube 38 has a vent overflow and is open during resin transfer from the regeneration vessel into the mixer tube 38.

The valve 416 carries demineralized water from line 20 to the filler tube 40 and loosens resin to maintain a fluid bed during transfer of resins from the filler tube 42 demineralizers by way of the valve 214. The valve 418 carries demineralized water from line 20 to the top of the filler tube 40 to maintain the liquid level above the resin as well as apply slight pressure, if required, to assist in demineralizer filling operations.

In the premixer 174 illustrated in FIGURE 5, openings 420 illustrated therein are spare openings which are normally plugged but which can be unplugged for use should additional regeneration tubes be added to the basic regeneration plant shown in FIGURE 1. As now illustrated, lines 172 and 168 carry resin from their respective regeneration tubes to premixer 174 through one set of openings 420. When additional regeneration tubes are required as part of the plant process, it is not necessary to duplicate mixer tube 38, filler tube 40 or separator 32 as provisions have been made to utilize these tubes with as many as two additional sets of regeneration tubes 34 and 36.

FIGURES 8–10 illustrate a variation in the apparatus for transferring exhausted ion exchange resins from the demineralizer service unit and includes facilities for simultaneously transferring exhausted ion exchange resin from a plurality of service units. In the drawings, the apparatus will accommodate four service units but it is pointed out that the number of service units which can be simultaneously accommodated may be varied. The multiple emptying vessel is generally designated by reference numeral 430 and may be constructed of plastic or non-corrosive metallic material and will be oriented in relation to the regenerating plant in the same manner as the emptying tube or vessel 30 and may be employed in lieu of the empting vessel or tube 30.

The multiple emptying tube or vessel includes a supporting stand structure 432 and a tank 434 having a funnel-like discharge 436 at the lower end thereof. An upwardly inclined supporting structure 438 is provided for the demineralizer service unit 48 with their being a suitable saddle 440 for receiving the service units and retaining them in inverted and substantially vertical but upwardly inclined condition.

The water line 442 which is connected to a water line, such as the water line 92 as illustrated in FIGURE 1, is controlled by a valve 444 for controlling flow through the multiple emptier tube 430.

The resins are emptied from the service units 48 by a hydraulic tube or hose 446 each of which has a valve 448 therein where it connects to a manifold pipe 450 which is in communication with the pipe 442 through the valve 440. A supporting member 452 engaging the inverted top of the service unit 48 has suitable notches 454 therein to enable hydraulic emptying of the service units 48 into the tank 434. Extending downwardly from the pipe 450 at the center of the end tank as illustrated in FIGURE 9 is a pipe 456 having a valve 458 therein which communicates with a pipe 460 which extends under the tank and communicates with a pipe 462 extending upwardly and connected to the water line 442. Disposed in the pipe 460 is an ejector assembly 464 for educting or ejecting resin from the funnel portion 436 of the tank 434. A valve 466 is provided in the pipe 462 and a valve 468 is provided in the pipe 460 on the downstream side of the ejector 464.

The resins are emptied from the demineralizers or deionizers and are retained in the multiple emptying tube or tank 430 until such time as transfer to the separator tube 32 in FIGURE 1 is desired. This is accomplished with the ejector 464 which is connected to the end of the funnel assembly 436 into which the resin travels. To transfer resins from the multiple emptying vessel or tank 434 to the separator tube 32, resin valve 468 is opened as is soft water valve 466 allowing water to travel through the ejector assembly 464 thereby drawing resins from the multiple emptying tube or tank 434 into the stream and through line 460 into line 470 which will be connected with the line 78 in FIGURE 1 and runs to the separator tube 32. When the proper charge of resin has been transferred to the separator tube 32, valves 466 and 468 are closed and clear the lines 456 and 470 of resins, the valve 458 may be opened along with the valve 444, thus carrying soft water from the branch line 90 connected to the pipe 442 through pipe 450, valve 458, pipe 456 and pipe 470.

Figure 11:
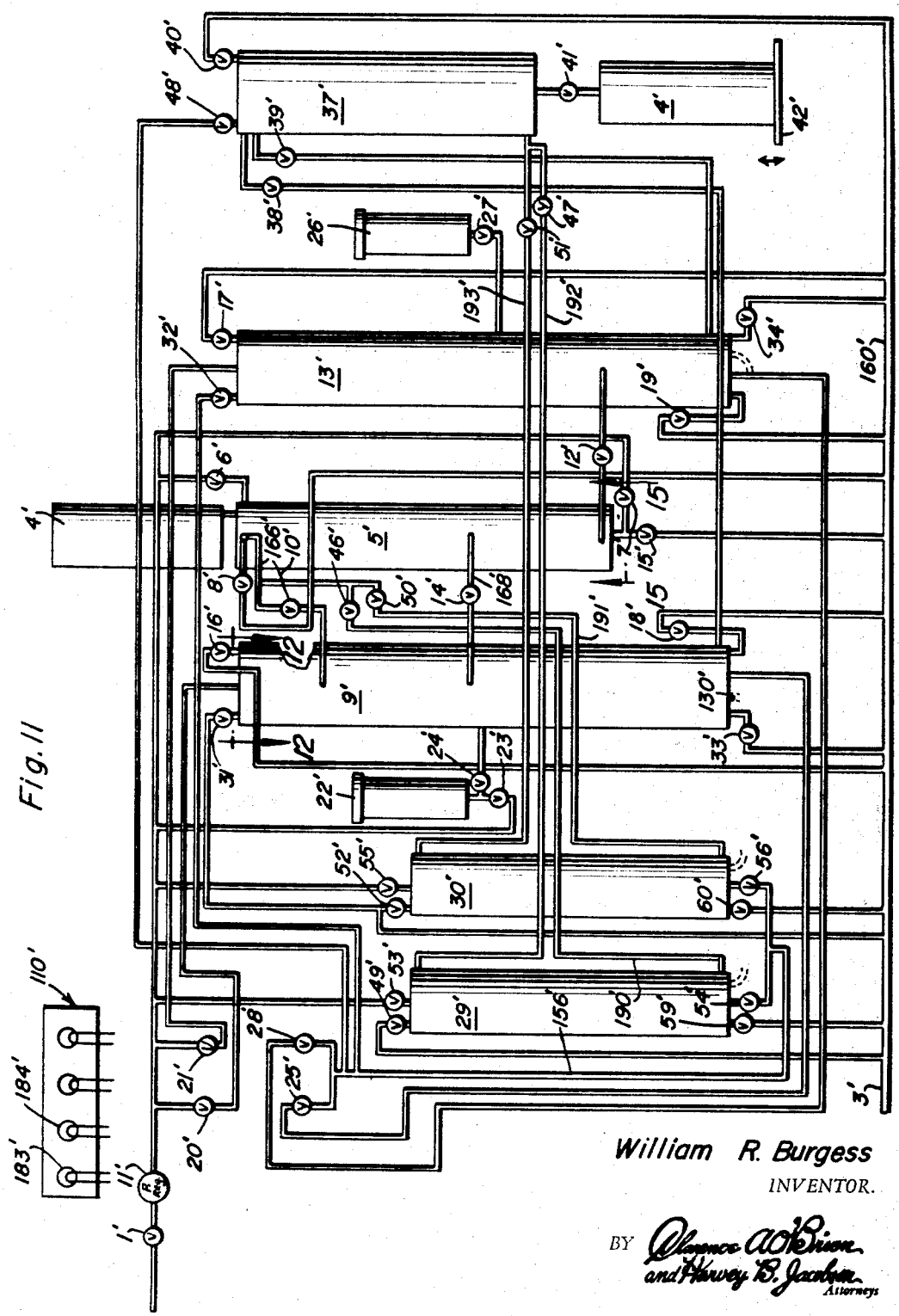
FIGURE 11 is a diagrammatic view of a regenerator plant by which the process or method may be practiced.
Figure 12:
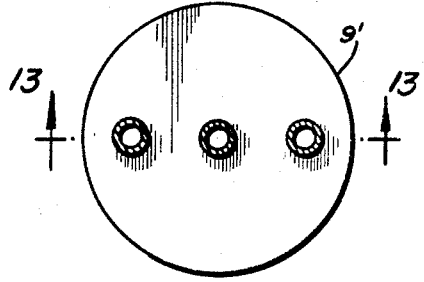
FIGURE 12 is a horizontal sectional view of the anion tube, which is identical to the cation tube and taken on the line 12—12 of FIGURE 11.
Figure 15:
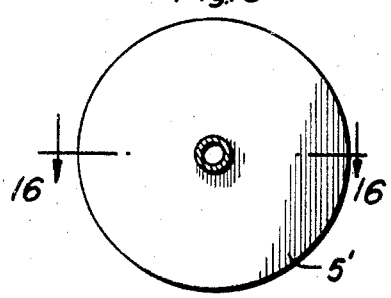
FIGURE 15 is a fragmentary sectional view of a separation tube and is taken on the line 15—15 of FIGURE 11.
Figure 13:
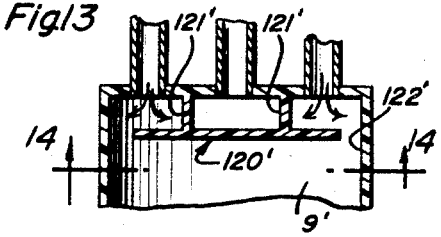
FIGURE 13 is a sectional view of the tube in FIGURE 12 and taken on the line 13—13 of FIGURE 12.

In the drawings FIGURE 11 is a diagrammatic view of the regeneration plant. Although this is a diagrammatic view, it illustrates a parts placement plant. To facilitate plant assembly, shipping and business preparedness, all plant materials and equipment may be permanently connected and mounted on a solid support. Thus, when a regeneration plant arrives, it may be placed in operation almost at once by connecting with a water line controlled by tap water valve 1', a conventional electric source of potential for the signal circuits, and a drain to drain line 3'.

Figure 16:
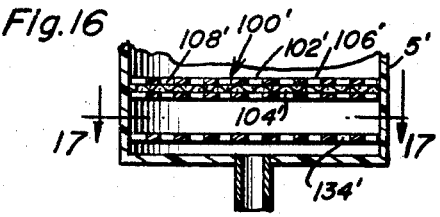
FIGURE 16 is a sectional view taken on the line 17—17 of FIGURE 16.

The plant vessel construction includes two identical plant demineralization units 29' and 30' to supply demineralized water for the regeneration process. Two units 29' and 30' are used so that one is always on standby anticipating the time when the other becomes exhausted. In this way demineralized water is always available without interruption. Each plant unit 29' and 30' has a screen assembly at the top and the bottom (FIGURE 16). Screen assembly 100' is typical, and it consists of a pair of disks 102' and 104' between which screen cloth 106' is supported. The disks have a plurality of aligned apertures 108' so as to provide an even distribution flow of water through the units. Further, each distribution unit has an electrical signal device 110' consisting of a pair of electrodes 112' and 114' in the bottom of the unit and to which an electrical circuit consisting of one or more resistors, a source of electrical potential and a signal device are operatively connected. A signal light, bell or other electrically stimulated signal may be used, and the signal device 110' functions to sense exhaustion of the unit, that is, the electrical resistance of the liquid between electrodes or considered in another way, the conductivity of the substance between the electrodes is what is used to render the signal operative and inoperative.

The anion tube 9' is the anion exchange material receptacle, and is the vessel in which anion regeneration is accomplished. The bottom of the anion tube is screened, for instance by a screen assembly identical to the assembly 100', and there is a top flow director 120' at the upper end and contained within the anion tube 9'. A flow director 120' attached by brackets 121' to the top of the tube 9', consists of a baffle extending transversely across anion tube 9' and having passageways 122' at its periphery, for instance by leaving a space between the inner surface of tube 9' and the periphery of the deflector 120'. The flow director 120' assures that the liquid will flow alongside of the inner surface of the anion tube, this being discussed in detail subsequently. An electrical signal device 130' identical to the described signal device 110' in function is wired to the anion tube at the lower part thereof.

Cation tube 13' is similar in construction to the anion tube 9'. However, it is the cation exchange material receptacle and is the vessel in which cation regeneration is accomplished. The bottom is screened, and there is a flow director near the top, together with a signal indicator circuit wired preferably at the bottom thereof.

Separator tube 5' performs the important function of separating the ion exchange materials. This is necessary as they cannot be regenerated when they are mixed. The ion exchange materials differ in density, which under controlled conditions, makes possible hydraulic separation. The ion exchange materials used are strongly basic anion exchange resin and strongly acidic cation exchange resin. These resins are commercially available and well known in this art. Of course, the process and equipment described herein is not limited to these but can be used with other combinations of ion exchange materials.

The bottom of the separator 5' is constructed so as to produce optimum hydraulic conditions for ion exchange material separation. In order to obtain uniform flow without turbulence when there is water upflow through the separator 5', the lowermost baffle 134' (FIGURE 16) consisting of a disk provided with a plurality of apertures, first disperses the water which flows uniformly up through the screen assembly 100'. An even turbulent-free flow results in perfect separation, and greatly reduced separation time. It is preferred that the separator have a removable top to facilitate use of the plant.

The filler tube 37' is the vessel where remixing is performed after regeneration. It also serves as a storage vessel for the ion exchange materials from which the demineralization service units 4 are filled.

Base chemical tube 22' and acid chemical tube 26' complete the complement of vessels. All plant vessels are preferably made of clear acrylic plastic, although any corrosion resistant material will suffice. It is strongly suggested that the separator tube 5' be made of clear plastic so that visual inspection of the content is possible at all times.

The service demineralizer 4' may be constructed in accordance with the referred to copending application Ser. No. 547,103. It may be made in other ways but preferably has aport in the top so that it may be inverted and positioned over separator tube 5'. Accordingly, the ion exchange material from service unit 4' may be removed through this port and emptied into the separator tube 5'. This removal is accelerated by connecting a tap water line to the unit outlet and opening valve 6'. When unit 4' is empty (upper unit in FIGURE 11) it is removed and chlorinated.

Before continuing with a description of the method or process involved herein, a brief description of how the vessels are interconnected is believed to be helpful since the various lines may be logically separated into groups. First of all, the tap water line is controlled by valve 1' upstream of a conventional pressure regulator valve 11'. Tap water coming from the pressure regulator is run to valves 20' and 21' in branch lines that connect to the top of the anion tube 9' and cation tube 13' respectively. Tap water also flows through branch lines to valves 53' and 55' which connect to plant units 29' and 30' respectively. Finally, tap water is piped by means of branch lines to the valves 6' and 7', which feed water to the top and bottom respectively of the separator tube 5'. Valve 23' is in a branch line to conduct tap water to the line at the bottom of base chemical tube 22' (FIGURE 11). These are the tap water inflow pipes used in the plant.

Considering now the lines which carry demineralized water, plant units 29' and 30' have valves 54' and 56' connected together by a T, and then one line 156' extends from the T connection and carries the demineralized water to a plurality of valves 25', 28', 31', 32' and 48' respectively in separate branch lines. Valve 25' is in a line which is connected to the bottom of anion tube 9'. Valve 28' for demineralized water is in a line which is connected to the bottom of the cation tube 13'. Valve 31' is in a line to conduct demineralized water from line 156', to the top of anion tube 9', and valve 32' is similarly connected to line 156' but is attached to the top of cation tube 13'. Valve 48' is in a line extending from demineralized water line 156', drawing demineralized water from either or both of the plant units 29' and 30'. to the filler tube 37'.

There are overflow valves connected so that there is one overflow line 160' to drain 3'. Starting at the left side of FIGURE 11, there is overflow valve 49' connected by a line to the single overflow conductor 160', the line controlled by valve 49' being attached to the top of plant unit 29'. A corresponding valve 52' and line for plant unit 30', is connected to the plant unit and to line 160'. Valves 16' and 17' are connected in lines which are attached to the top ends of the anion and cation tubes and to the main drain line 160'. Valve 40' is connected in a line attached to the top of the filler tube 37' and the main drain line 160'. The valves and lines described in this paragraph are used for overflow purposes, conducting the overflow liquid directly to drain 3' through line 160'.

Certain vessels of the plant have drain lines in order to empty the vessels. Valve 59' is connected to a drain line which is secured to the bottom of plant unit 29' and to the main drain line 160'. Valve 60' is connected in a line extending from the bottom of the second plant unit 30' and main drain line 160'. Valve 33' is in a line similarly connected but with the anion tube 9' and line 160'. Valve 34' is connected in a line which extends from the bottom of the cation line tube to the main drain line 160'. Valves 18' and 19' are in lines which extend from the bottom of the anion and cation tubes and which are attached to main drain line 160', but note that these last lines controlled by valves 18' and 19' extend upwardly a short distance before returning downward to main line 160'. Valve 15', adjacent to valve 7', is in a line which connects with the tap water line that is controlled by valve 7, and which connects to the bottom of the separator tube 5'. This line, that is, the one controlled by valve 15', is also connected with the main drain line 160'. Finally, valve 8' is connected at the top of the separation tube by a branch line which extends from the top of the separation tube to the main drain line 160'.

Although the above does not account for every liquid conducting line, most of the lines are described, and they are separated into three groups, that is, those for conducting tap water to the various vessels of the plant, those carrying demineralized water from the plant units 29' and 30' and those used for overflow and those used for drain in the plant.

After emptying a typical service unit 4' so that the contents enter separator tube 5', tap water is introduced to the bottom of separator 5' by opening valve 7'. The overflow to the drain valve 8' is opened, and the flow to the separator 5' is controlled to keep the ion exchange material in the separator but yet allow any foreign matter filtered out when the unit was in service, to be washed out. Once the overflow wash water is free of turbidity, the overflow waste valve 8' is closed and the overflow valve 10' to the anion tube 9' is opened. Overflow valve 10' is in a line 166' which connects between the top of separator tube 5' and the anion tube at a place approximately three-quarters of the way upon the anion tube. Water flow is increased to facilitate the separation of the cation exchange and anion exchange materials. Optimum separation flow conditions are obtained by presetting the pressure regulator 11' to control the flow of tap water. Since the anion exchange material is less dense, it overflows into the anion tube 9' through line 166'. When perfect separation has occurred, as is evident by visual inspection, the transfer valve 12' in a line between the bottom of separator tube 5' and the cation tube 13' approximately three-quarters of the way down the tube, is opened to carry the cation exchange material to the cation tube 13'. Valve 12' is closed when the interface area, (contact area of the cation and anion material) drops to a height just above the line containing valve 12'. Valve 14' in a line 168' between separator tube 5' and approximately the center of anion tube 9', is opened and the remainder of the anion exchange material is transferred to the anion tube 9'. When this is accomplished valve 14' is closed.

Then the water valve 7' is closed and the drain valve 15' is opened, and the water is drained from the separator tube 5'. During separation valves 16' and 17', which are air vent valves, and the drain valves 18' and 19' on the anion and cation tubes are opened. The drain valves 18' and 19' are positioned, as mentioned briefly previously, so that the water level in the cation and anion tubes remains above the ion exchange material which will be located at the bottom of the anion and cation tubes respectively. It is emphasized that water is run upflow through the separation tube 5′ during the entire separation procedure. The separation procedure is repeated for several more units, that is, the illustrated unit 4′ at the top of FIGURE 11 is removed and replaced by another. Any number of such units may be processed in this way until the capacity of the plant is reached. Complete separation is possible as it is not necessary to take all cation and anion exchange material from the separator 5′. In fact, a volume of three inches on either side of the interface is always left in the separator. Accordingly, they are never regenerated in mixed condition.

Thereafter, valve 20′ is opened to admit tap water to the top of the anion tube to a predetermined height. An hydroxyl base chemical, in one instance caustic soda, is added to the base chemical tube 22′ through the top of the base chemical tube, in the prescribed quantity. Tap water is added upflow to the base chemical tube 22′ by opening valve 23′ which is in a branch line connected to the tap water supply. This upflow action dissolves the base chemical most readily, the reaction being hastened by the heat generated as the base goes into solution. Valve 23′ is closed and the base solution is run into the anion tube 9′ by opening valve 24′ in a line which connects between valve 23′, base chemical tube 22′ and the anion tube 9′ intermediate the upper and lower ends of the latter. When the transfer is completed the base chemical tube 22′ is rinsed with water by opening valve 23′, and the rinse water is run into the anion tube as valve 24′ is left opened. After rinsing, valve 24′ is closed.

Demineralized water is then run upflow into the anion tube 9′ to a predetermined height by opening valve 25′. This upflow serves two important purposes: to thoroughly dilute and distrtibute and mix the base solution; and to loosen or fluff the ion exchange material. The latter provides greater chemical contact thus improving regeneration. Drain valve 18′ is opened to the optimum regeneration flow rate setting and the base solution flows down through the anion exchange bed in anion tube 9′.

Tap water is added to the cation tube 13′ to a predetermined height by opening valve 21′. The heights of liquid in the tubes 9′ and 13′ are directly inspected, and it is for this reason that transparent or partially transparent vessels are suggested. The prescribed amount of acid, in one instance hydrochloric acid, but not restricted to this particular acid, is added to the acid chemical tube 26′ through its open top by means of gravity feed from an acid storage vessel (not shown). Valve 27′ in a line leading from chemical tube 26′, is conducted to the cation tube 13, allowing the acid to flow into the cation tube. Then, acid chemical tube 26′ is rinsed with tap water by opening valve 6 to which a flexible tube (not shown) is attached and the water transfer valve 27′ is closed. Valve 28′ is opened and demineralized water is caused to run upflow into the cation tube 13′ to the correct height. Drain valve 19′ is opened to the optimum regeneration flow rate setting and the acid solution flows down through the cation exchange bed in the cation tube 13′. The purpose of the base and acid is to remove the anion and cations from the exchange materials and return them to their regenerated hydroxyl and hydrogen state. The regenerant level in the anio tube 9′ and cation tube 13′ falls as regeneration occurs. However, the level can fall no farther than the drain valves 18′ and 19′ in the lines which they control, because of their location above the lower extremity of the anion and cation tubes 9′ and 13′ respectively. In this way the beds never run dry, and therefore, this phase of regeneration may proceed unattended.

Figure 14:
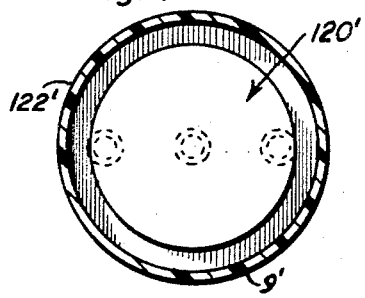
FIGURE 14 is a sectional view taken on the line 14—14 of FIGURE 13.
Figure 17:
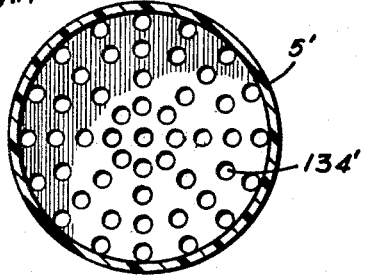

When the regenerant flow is stopped, the cation and anion exchange materials are rinsed free of the remaining regenerants. This is done with demineralized water supplied by plant units 29′ and 30′. Demineralized water enters the anion tube 9′ by opening a valve 31′; opening valve 32′ allows demineralized water to enter cation tube 13′. Drain valve 33′ is open to hasten rising of the anion exchange material; and a drain valve 34′ is opened to hasten the cation rinsing. The flow directors in the tubes 9′ and 13′ guide the rinse water down the side walls of the anion tube 9′ and cation tube 13′ (see FIGURE 14) removing the regenerant chemicals.

Figure 18:
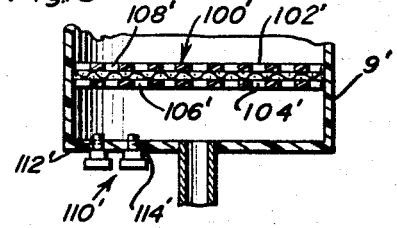
FIGURE 18 is a fragmentary sectional view of the bottom portion of one of the regeneration tubes.

A major improvement provided by this invention is the rinse end point indicator. When all chemicals are removed, the water flowing to drain is demineralized. The anion tube 9′ has an electrical signal device 110′ (FIGURE 18) consisting of the two mentioned electrodes which are connected in circuit to denote rinse end point. This holds true for the cation tube which also has two electrodes and a signal circuit. By setting the signal circuit, which is merely a simple pair of electrodes, a source of potentional, a resistor and an electrically operated signal (lamp, bell, etc.) to respond to conductivity of the liquid between the electrodes, the signal circuit is set to respond when the rinse water is free from minerals, thereby indicating completion of rinsing. When the signal is activated, the valves 31′ and 32′ are closed, and so are valves 33′, 18′, 34′ and 19′ thereby stopping the flow through the anion and cation tubes.

The next step is to transfer the ion exchange materials to the filler tube 37′. Remixing is accomplished at the same time. This is done by opening overflow valves 16′ and 17′ and passing demineralized water upflow through the anion tube 9′ and the cation tube 13′ by opening valves 25′ and 28′ which operatively connect with the demineralized water line 156′. This serves to loosen and fluff the beds. When this is accomplished valves 16′ and 17′ are closed and valves 38′ and 39′ are opened. The lines with which these valves are associated carry the ion exchange materials to the filler tube 37′ from the anion tube 9′ and the cation tube 13′. The flow of demineralized water in the anion and cation tubes builds up pressure within these tubes forcing the resin into the filler tube 37′. The ion exchange materials, usually resinous, remain fluid due to the upflow action of this water, and therefore, there is no clogging of the lines.

The lines carrying the ion exchange materials converge at the top of the filler tube 37′ so that the streams are intermixed as they enter. The correct proportion is maintained by regulating valves 38′ and 39′. Visual observation of the contents of the anion tube and the cation tube discharge rate provides perfect proportioning, as tubes 9′ and 13′ are sized so that the anion exchange material level in each is the same, although the total quantities may differ. Thus, by bringing the level in each down equally, perfect proportioning and mixing is obtained. Valve 40′ is, of course, opened during material transfer to allow flow to drain from the filler.

Once the tubes 9′ and 13′ are empty, the flow of water is stopped by closing valves 25′ and 28′. Then valves 38′ and 39′ are closed. The chlorinated units 4′ are drained and placed under a valve 41′ which is in a line at the bottom of the filler tube 37′. The line containing valve 41′ has an adapter which inserts and seals on the port on the top of each unit 4′. Platform 42′ holds unit 4′ in position for filling from filler tube 37′. Valve 41′ is opened and the mixed ion exchange materials flow into the unit 4′. Mixing continues as the ion exchange material flows into the unit.

Figure 19:
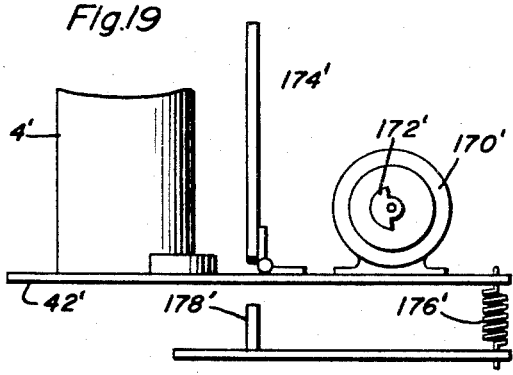
FIGURE 19 is a diagrammatic view showing a typical vibrator for the service unit that is filled from the filler tube in FIGURE 11.

There is mechanical agitation of unit 4′ while it is being filled. An electric vibrator, for example motor 170′ with an eccentric 172′ on the motor shaft, is bolted onto the platform 42′. The platform is diagrammatically shown as suspended from a hinged support 174′ and is counterbalanced by a spring 176′ at one end of the platform. A stop 178′ is located beneath the platform to limit oscillations of the platform. Although any conventional type of vibrator may be used, the illustrated vibrator (FIGURE 19) serves the purpose. The vibrating action, though, is important in that it allows approximately 20% more ion exchange material to enter the unit 4' thereby increasing the capacity by corresponding percentage were it not to be used.

Plant units 29' and 30' provide a source of demineralized water for the regeneration process. They, too, have electric signal devices such as signal device 110', whereby indicator lights 183' and 184', bells, buzzers, etc. will indicate exhaustion of the plant units. A bank of lights is shown in FIGURE 11, merely diagrammatically representing the signal circuit functions. To process the ion exchange material, in the case of plant unit 29', valve 54' is closed and valve 53' is opened as is valve 46' in a line 190' extending from the bottom of plant unit 29' to line 166'. An, resin flows into the separator tube 5' where it is regenerated in the above described manner. Overflow valve 49' and drain valve 59' are opened which empties the plant unit 29' of water. Plant unit 29' is filled with regenerated resin by opening valve 47' which is in line 192' extending from the lower part of filler tube 37' to the top of plant unit 29'. This line 192' conducts ion exchange material from the filler tube 37' to the plant unit 29', introducing it to the top part of the plant unit. Valve 40' is closed and valve 48' is opened to provide demineralized water from plant unit 30' to the filler tube 37' which provides the pressure to carry the ion exchange material to the empty plant unit 29'. Valve 49' is opened to allow water overflow to drain. Plant unit 30' may be emptied and refilled in the same manner employing valves which correspond to those described in connection with unit 29', noting that valve 51' is in a line 193' which responds in function to line 192', and valve 50' is in a line 191' which responds in function to line 190'.

One of the major improvements provided by this invention resides in the rinse end point indicator inasmuch as this will indicate that when water flowing to the drain line is demineralized, all of the chemicals have been removed. The electrical signal device is associated with all of the regenerating tubes 34, 36, 42 and 44 to indicate rinse end point. By setting the signal circuit, a source of potential, an electrically operated signal such as a lamp, bell or the like to respond to conductivity of the liquid between the electrodes, the signal circuit is set to respond when the rinse water is free from minerals and chemicals thereby indicating completion of rinsing. Other advantages and significant features of the invention are summarized as follows:

(1) A system of multiple regeneration wherein the ion exchange materials from more than one service unit (both mixed bed and separate bed) are regenerated simultaneously. Separator tube 32 may receive the ion exchange material from any number of service units 48, depending on the capacity of the separator tube and the other vessels, available tap water pressure, etc.

(2) A separate anion regeneration tube equipped with a signal device to indicate the end of the rinse cycle.

(3) A separation tube which assures complete separation, as a portion of the ion exchange materials at the interface, where the separated ion exchange materials meet, is left in the separation tube 32 so that no mixed ion exchange materials are regenerated in the same tube. The separator tube 32 is constructed with a system of baffles and screened holes so as to provide an even upflow distribution of water, without turbulence, which makes possible faster and more complete separation. Positive and definite steps have been taken to assure that there is no turbulence in this phase of the plant operation.

(4) The transfer of the separated ion exchange materials from the separator tube 32 is done while water is running upflow through the bed which eliminates the need for tube insertion to accomplish transfer as the bed remains fluid. This prevents flow stoppage in the transfer pipes and valves.

(5) A separate cation regeneration tube equipped with a signal device to indicate the end of the rinse cycle.

(6) A separate filler tube which acts as a mixing and storage chamber from which the service demineralization units are filled.

(7) All plant tubes are windowed or constructed of clear material, so that each regeneration step may be visually observed.

(8) Demineralizers are completely emptied of ion exchange materials and they are not a functional part of the regeneration procedure and are chlorinated as standard procedure to comply with health requirements.

(9) A procedure of separation whereby the ion exchange materials are cleansed of foreign matter, separated and run into their respective regeneration tubes during which water upflow is maintained; an overflow whereby the lighter ion exchange material is allowed to run into its regeneration tube permitting greater water flow which hastens separation without loss of expensive ion exchange material. This system of separation eliminates the need for transfer tube insertions, funnels, overflow weirs, ion exchange material loss, butterfly valves and siphoning equipment etc., all necessary or considered necessary as a part of the prior art procedures in this field of endeavor.

(10) The regeneration tubes are designed to hold the ion exchange material from any number of service demineralizers and still allow adequate area above the beds to hold the required amount of regenerant, diluted to the optimum concentration. A variance from this design is to have the regeneration tubes sized to hold the ion exchange materials only, and have separate tubes for the regenerant solutions.

(11) The drain to waste from each regeneration tube is positioned so that the downward regenerant flow stops at the top of the ion exchange bed. In this way this phase of regeneration can proceed unattached with no fear of the bed running dry. Were this to happen, air pockets would surely form and the rinse, which follows the regenerant, would not be completely effective.

(12) Once rinsing is completed, as indicated by the electrical signal device, the important step of remixing follows. Thorough mixing results in higher quality water and greater capacity. This invention accomplishes this in a simple and novel way; that is of directing the streams of each ion exchange material into the mixer tube via the premixer. The flow of each tube is controlled by valves which are regulated according to the visual drop of these materials as they leave the regeneration tubes. Ion exchange materials in the regenerated state have a tremendous affinity for one another, thus when directed together in the proper proportions, a homogeneous mixture results. This eliminates the need for adjusting water volumes prior to air mixing, air compressors, funnels and other costly equipment. In addition, no air can be left in the resin which would reduce capacity as the untreated water would not penetrate the air locked areas.

(13) Greater unit capacity is offered since more mixed ion exchange materials are put into the demineralizer service units. In order to obtain maximum capacity, this invention uses a vibration system whereby the service demineralizer unit is vibrated as it is filled. Capacity increases of approximately 20% result from this novel application of a vibrator which may be either standard or non-conventional.

(14) The chemical regenerant is fed to the ion exchange material by gravity. This system, therefore, being a non-pressure system is far safer than those previously disclosed. In pressure systems, there is always danger to men and equipment should a vessel leak, a connection hose or a pipe break. Whenever pressure is needed for the other phases in this regeneration system, the pressure is regulated by the pressure regulator 16.

(15) The demineralization units are not and need not ever be subjected to strong chemicals which assures a longer life and a better appearance.

(16) The regenerant wastes are neutralized before entering the drain and sewer lines. This is accomplished by mixing the acid and base wastes in the main drain line 22. An equivalent amount of each are used and as the degree of expenditure of each is proportionate, each accomplishing approximately the same amount of regeneration in terms of ion exchange; and as the regenerant flow rates are equal, neutralization of the regenerant wastes results. Should the neutralization reaction not be in equilibrium, the regeneration wastes can be further neutralized by passing them through a bed of calcium carbonate. In any event, this procedure may be recommended as a precautionary measure.

(17) In a service demineralization system, the greatest possible capacity is the desired goal. Every effort of this system leads to this end result. This is exemplified in the use of demineralized water for regeneration, vibration to compact the bed during regeneration, the use of demineralized water in material transfer and filling, preventing air pockets from forming in the ion exchange materials, observing the best known conditions as pertain to type and concentration of regenerants and regenerant contact time; and the use of the vibrator to pack the ion exchange material in the service units.

The particular organization of the components as illustrated in the drawings provides an extremely compact arrangement which enables the use of the forces of gravity where appropriate and also enables installation of the entire assembly in a relatively compact manner. This further enables the service demineralizer units to be easily emptied into the regeneration plant and while the resins are being regenerated, the service demineralizing units may also be treated, cleaned, chlorinated or the like so that they may be ready for refilling with this phase of the operation being conducted at a point remote from the regeneration plant if desired. Various electrical circuitry may be provided wherever necessary for the indicator lights, vibrators and the like and the specific plumbing details also may be varied depending upon the particular installational requirements of the plant.

The foregoing is considered as illustrative only of the principles of the invention. Further, since numerous modifications and changes will ready occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. The process of regeneration of a plurality of exhausted service demineralizers employing the mixed-bed principle of water demineralization and each including a service unit completely filled with a mixed bed of exhausted anion and cation exchange materials comprising the steps of removing the exhausted ion exchange materials entirely from the unit, removing impurities from the exhausted ion exchange materials, completely separating the anion exchange material from the cation exchange materials by hydraulic separation, by passing water upwardly through said exhausted ion exchange materials, transferring the anion exchange material and the cation exchange materials to their respective regeneration vessels, repeating the above steps so that the exhausted ion exchange materials from more than one service unit are transferred to their respective regeneration vessels and may be regenerated simultaneously, passing a caustic solution through the exhausted anion exchange material from a plurality of service units thereby regenerating it to the hydroxyl state, rinsing the regenerated anion exchange material with downwardly flowing demineralized water to an end point indicated by an electrical signal, simultaneously passing an acid solution through the exhausted cation exchange material from a plurality of service units thereby regenerating it to the hydrogen state, rinsing the regenerated cation exchange material with downwardly flowing demineralized water to an end point indicated by an electrical signal, hydraulically mixing the regenerated rinsed ion exchange materials in a filler tube, and transferring this mixture to a service unit which is completely filled due to mechanical agitation.

2. The process as defined in claim 1 wherein the step of mixing the regenerated rinsed ion exchange materials includes transfer of the materials to a premixer and subsequently into a mixer tube.

3. The process as defined in claim 1 together with the step of transferring mixed regenerated materials to a filler tube by using demineralized water.

4. The process as defined in claim 1 together with the step of compacting the anion and cation exchange materials during regeneration to prevent channelization and formation of air pockets.

5. The process as defined in claim 1 together with the step of retaining a residual interface between the separated cation and anion exchange materials in the separation step.

6. The process as defined in claim 1 together with the step of completely exhausting the exhausted ion exchange materials by passing a brine solution therethrough prior to hydraulic separation, and rinsing the completely exhausted ion exchange materials before hydraulic separation to render the hydraulic separation step more complete.

7. The process as defined in claim 1 wherein the regenerating caustic and acid solutions are passed downwardly through the separated exhausted ion exchange material by gravity flow.

8. The process of regenerating exhausted service demineralizers employing the mixed-bed principle of water demineralization and each including a service unit filled with a mixed bed of anion and cation exchange materials comprising the steps of (1) removing the ion exchange materials entirely from more than one exhausted service demineralizer and collecting the removed materials in a regeneration batch (2) hydraulically separating the anion exchange material from the cation exchange material in said regeneration batch (3) transferring only anion exchange material to a separate anion regeneration vessel and only cation exchange material to a separate cation regeneration vessel (4) regenerating the anion exchange material and thereafter rinsing the regenerated anion exchange material with demineralized water until a specific purity end point is reached and regenerating the cation exchange material and thereafter rinsing the regenerated cation exchange material with demineralized water until a specific purity end point is reached (5) transferring the regenerated anion exchange materials and the regenerated cation exchange materials from their respective regeneration vessels to a mixing means separate from the service units and regeneration vessels (6) mixing the regenerated ion exchange materials in the mixing means by using a mixing fluid substantially inert with respect to the regenerated ion exchange materials, said regenerated ion exchange material being mixed in a substantially uniform ratio (7) thereafter transferring the mixed regenerated ion exchange materials from the mixing means into empty service units and completely refilling the empty service units by mechanical agitation.

9. The process as defined in claim 8 together with the step of compacting the cation and anion exchange materials during regeneration thereof.

10. The process as defined in claim 8 together with the step of completely exhausting the ion exchange materials before hydraulic separation thereof.

11. The process as defined in claim 10 together with the step of compacting the cation and anion exchange materials during regeneration thereof.

12. The process as defined in claim 11 together with the step of rinsing the completely exhausted ion exchange materials before hydraulic separation.

13. The process as defined in claim 12 wherein the step of compacting includes the step of independently mechanically agitating the ion exchange materials and the step of completely exhausting the ion exchange materials includes the step of passing a brine solution through the ion exchange materials after removal from the exhausted service demineralizers.

References Cited

UNITED STATES PATENTS

| | | | |
|---|---|---|---|
| 2,572,082 | 10/1951 | Welsh | 210—33 |
| 2,692,244 | 10/1954 | Kunin et al. | 210—37 X |
| 2,736,698 | 2/1956 | Klumb et al. | 210—33 |
| 2,744,066 | 5/1956 | Spiess et al. | 210—33 X |
| 2,767,140 | 10/1956 | Fitch | 210—33 |
| 3,193,498 | 7/1965 | Platzer et al. | 210—189 X |

SAMIH N. ZAHARNA, *Primary Examiner.*

C. M. DITLOW, *Assistant Examiner.*

U.S. Cl. X.R.

210—33, 189